May 8, 1962 P. F. M. PITAVY 3,033,255
DEVICE FOR CUTTING AND SLICING VEGETABLES AND FRUIT
Filed April 30, 1959 5 Sheets-Sheet 2
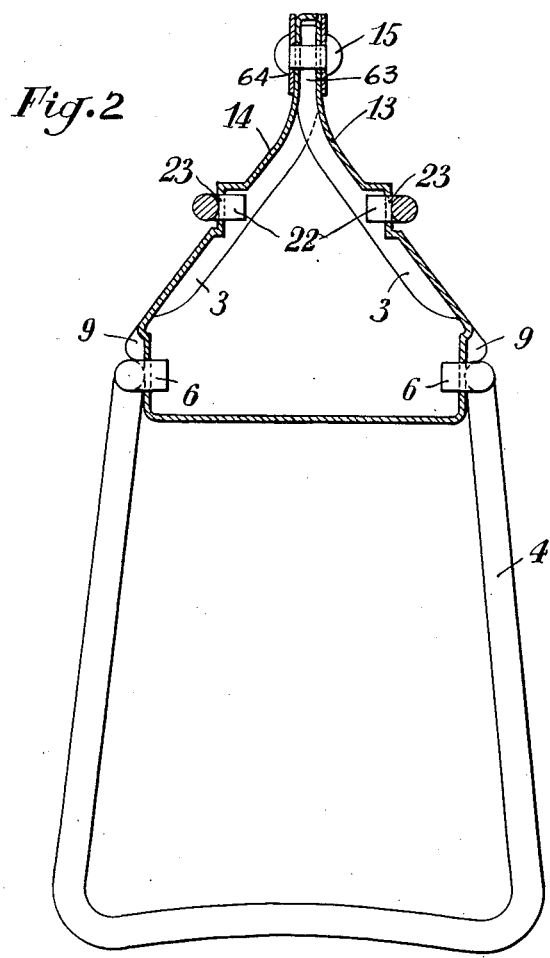
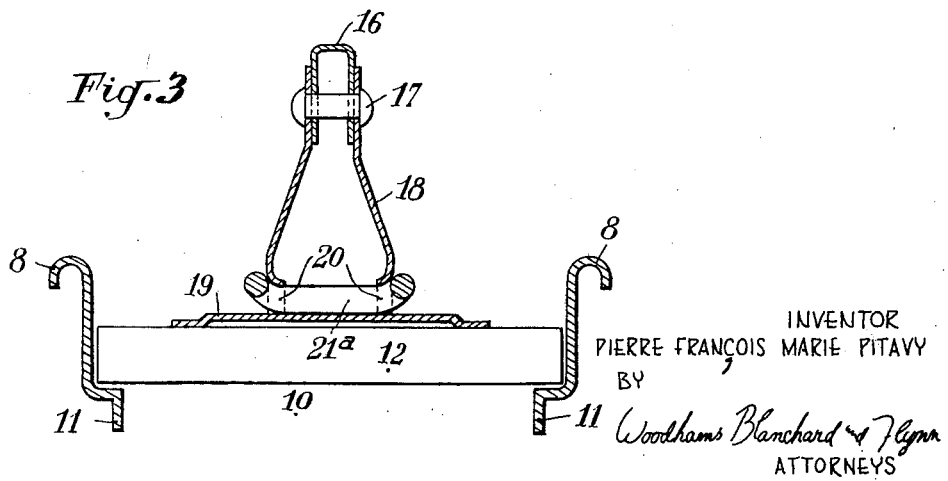
INVENTOR
PIERRE FRANÇOIS MARIE PITAVY
BY
Woodhams Blanchard & Flynn
ATTORNEYS

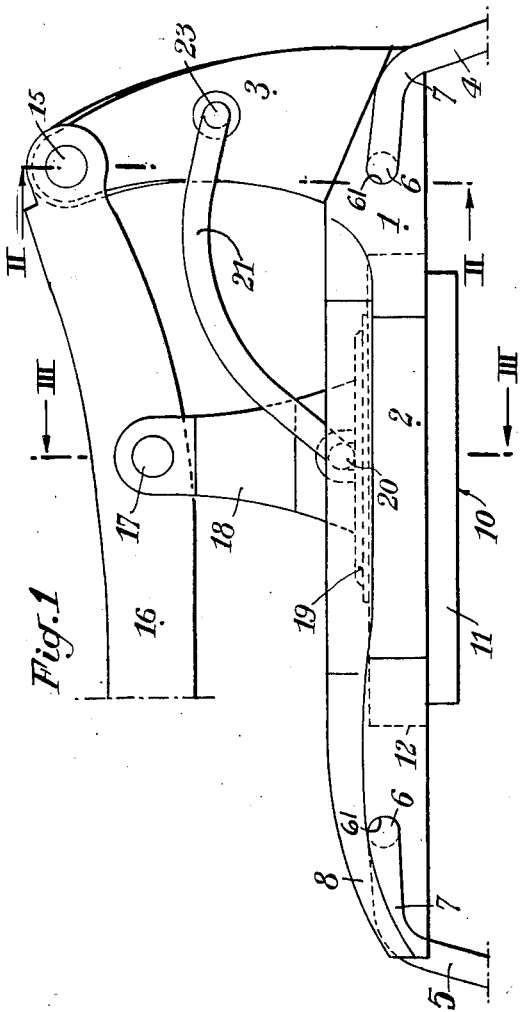

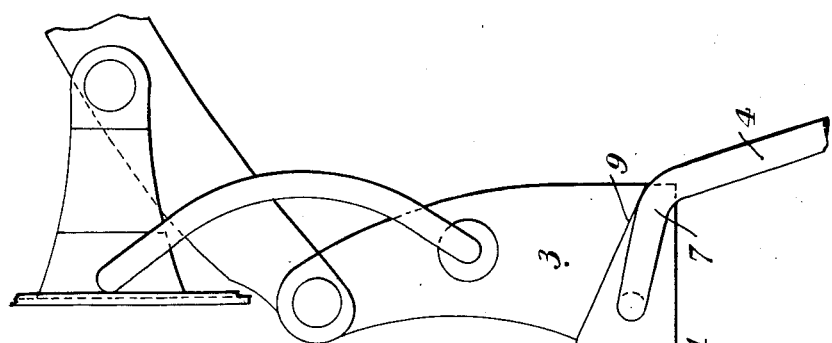

May 8, 1962 P. F. M. PITAVY 3,033,255
DEVICE FOR CUTTING AND SLICING VEGETABLES AND FRUIT
Filed April 30, 1959 5 Sheets-Sheet 4

INVENTOR
PIERRE FRANÇOIS MARIE PITAVY

BY
Woodhams Blanchard and Flynn
ATTORNEYS

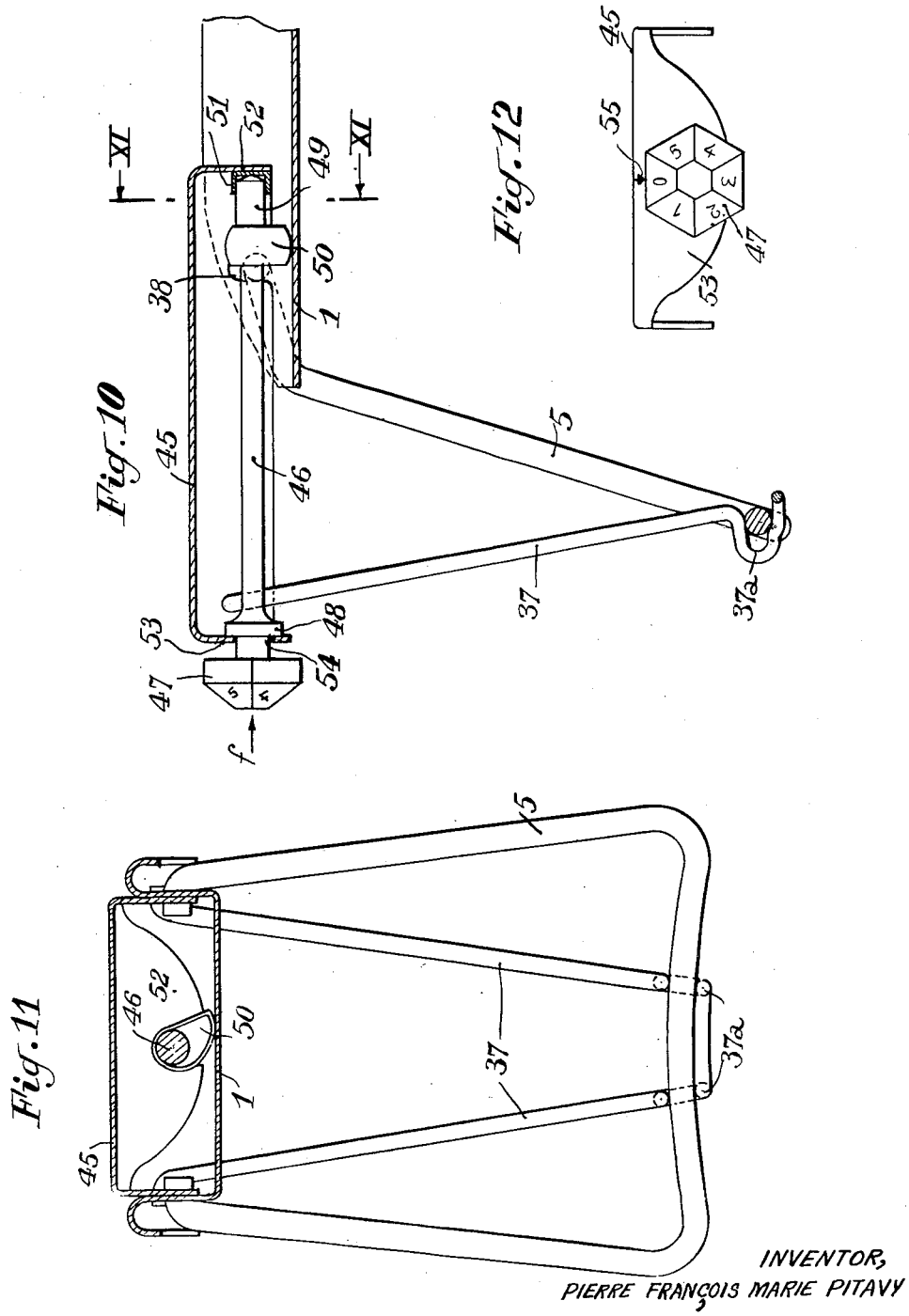

United States Patent Office 3,033,255
Patented May 8, 1962

3,033,255
DEVICE FOR CUTTING AND SLICING
VEGETABLES AND FRUIT
Pierre François Marie Pitavy, Chalon-sur-Saone, France, assignor to Societe Industrielle de Ferblanterie, Paris, France, a corporation of France
Filed Apr. 30, 1959, Ser. No. 810,073
Claims priority, application France Mar. 24, 1959
3 Claims. (Cl. 146—169)

The invention relates to devices intended to cut-up potatoes into stick or "chips" and various other vegetables or fruit, and has for its object an improved and simplified form of construction of the device described in the French Patents No. 775,921 of the 6th of October 1933, No. 779,656 of the 18th of March 1935 and No. 801,138 of January 24th, 1936 in the name of the present applicant.

It has been sugested heretofore to provide an apparatus for cutting up potatoes and other fruits and vegetables which comprises a frame having a grid of cutting blades mounted thereon and having a push plate hingedly mounted thereon. The push plate may be manually operated to push a potato or other fruit and vegetable through the grid and thereby cut same into sticks of the desired cross section. When it is desired to cut the fruits or vegetables into flat slices, a second device comprising a straight blade and a corrugated blade is mounted on the frame. A plate, whose slope is adjustable, is also mounted on the frame and this supports the fruit or vegetable as it is being moved toward the blades.

The apparatus in accordance with the present invention is distinguished from the prior apparatus mentioned above mainly by the total separation of the two devices. As a result the frame of the first device no longer has to receive and to support the plate of the second device with its adjustment device and thus may have substantially smaller dimensions corresponding to the strict minimum required by potatoes of ordinary size. In the same manner, the dimensions and thicknesses of the other constituent parts of the chip-cutting device may be reduced.

The plate of the second device thus constitutes an independent assembly which is simply hooked on to the frame, extends well beyond the length of this latter and also possesses its own adjustment device.

The apparatus in accordance with the present invention thus has the following advantages with respect to its predecessor:

Reduction of length of the constituent parts of the chip-cutting device.

Substantial reduction of the thicknesses of metal of the frame and of the lever since the bending moments to which they are subjected vary in proportion to their length.

The possibility that a customer can purchase either the first device alone or both devices in combination.

Other improvements contributing to the same object of reducing the cost price will be set forth in the following description with reference to the accompanying drawings in which:

FIGURE 1 is a side elevational view of the machine for making sticks.

FIGURE 2 is a sectional view, on an enlarged scale, taken on the line II—II of FIGURE 1.

FIGURE 3 is a sectional view taken on the line III—III of FIGURE 1.

FIGURE 4 is a plan view of the connecting rod.

FIGURE 5 is a sectional view taken along the line V—V through the connecting rod shown in FIGURE 4.

FIGURE 6 is a side elevational view of the machine shown in FIGURE 1 with a device for making slices mounted thereon.

FIGURE 7 is a sectional view taken on the line VII—VII of FIGURE 6.

FIGURE 10 is a view, partially in section, of a fragment of FIGURE 6 with a modified form of a device for making slices mounted thereon.

FIGURE 11 is a sectional view taken on the line XI—XI of FIGURE 10.

FIGURE 12 is an end view of a portion of the structure of FIGURE 10 looking substantially in the direction of the arrow F.

Figure 8:
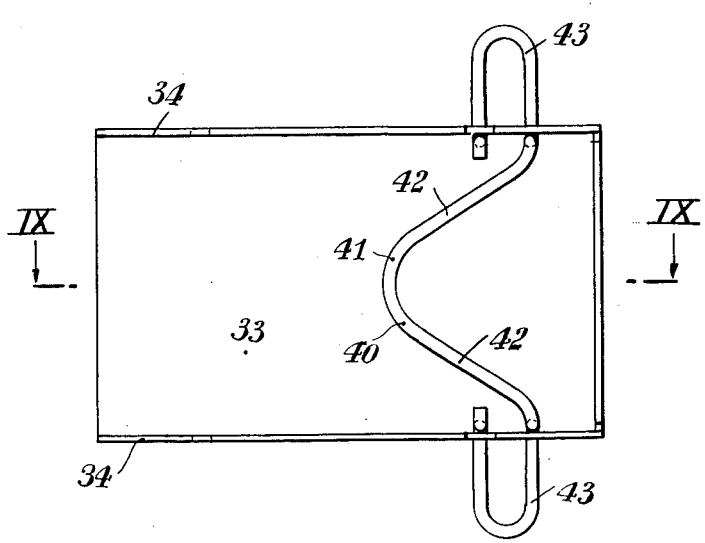
FIGURE 8 is a bottom view of the device for making slices.

The first device for cutting the fruits or vegetables into sticks comprises:

A frame 1 constituting at the same time a horizontal beam 2 and a vertical "hinge" 3, the whole being made in one single piece cut-out from sheet-steel, perforated and stamped. At each extremity of the beam 2 is pivotally mounted a wire leg of round section with the reference 4 on the hinge side and 5 on the opposite side. These legs (FIG. 2) have substantially the shape of a trapeze; the extremities 6 of each wire forming a leg are curved back to the horizontal and pass through circular holes 61 of the same diameter formed in the vertical cheeks of the beam 2. In FIG. 1 it may be seen that the legs comprise at their upper portion a curved portion 7 which on the one hand enables the two legs to be completely folded beneath the frame for storage purposes and which on the other hand forms an abutment in the position of use of the apparatus. The leg 5 butts underneath a groove 8 thus contributing to the increase of the moment of inertia of the beam; the leg 4 butts against a rib 9 formed at the junction of the beam 2 and the hinge 3.

These two legs made of round wire have the following advantages with respect to the sheet-steel legs used in the prior apparatus:

A saving of metal; no loss in cutting the wire.

Elimination of four rivets, the wire legs being simply placed in position by elasticity.

The beam 2 comprises in its central portion a circular opening 10 bordered by a stamped ring 11, the whole assembly providing an excellent support for the cutting grid 12.

The "hinge" 3, of triangular shape, the advantages of which will be shown below, has two side plates 13 and 14. At the top, one of the side-plates 13 comprises a punched male portion 63 fitting into a punched female portion 64 of the side-plate 14. The assembly thus constitutes a very robust head which receives the rivet 15 of the operating lever 16.

A forked member 18, the horizontal base of which is welded electrically to the push plate 19 is pivotally mounted on the lever 16 by a rivet 17.

The fork 18 is provided at its base with a slot 20 which in the course of assembly will be mounted astride the horizontal member 21a of a round rod member 21 forming a connecting-rod. The fork 18 being placed in position by being welded electrically to the push plate 19 an extremely simple and economical pivotal mounting of the connecting rod 21 is thus constituted.

This connecting rod 21 (FIGS. 1, 4 and 5) has the shape of an open rectangular link, the extremities 22 of which pass into openings 23 of the same diameter provided in the hinge 3; it is put into position by simple elasticity and constitutes the fourth side of the articulated quadrilateral 15—17—20—23, which determines the stroke of the push plate 19.

This connecting rod 21 has the following advantages with respect to the connecting rod used in the prior apparatus:

Saving of metal, no loss whatever in cutting the wire.

Elimination of two pivotal shafts and the riveting of said shafts.

A third and important advantage which can be credited to the use of the wire connecting-rod results from the fact that the use of the wire connecting rod 21 permits of a stamping (see FIG. 2) of simple triangular shape, to form the hinge 3. Constructed in this manner, the triangular hinge offers substantially greater resistance to the different stresses to which it is subjected, as compared with the previous type; the reduction of thickness of the sheet-steel of the single-unit frame which is made possible by the reduced length of the beam 2, would not have been acceptable for the previous design.

Figure 9:
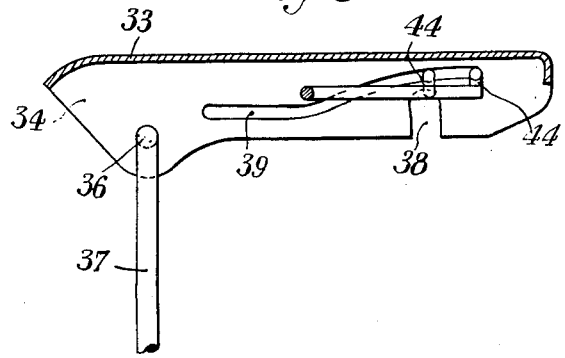
FIGURE 9 is a sectional view taken on the line IX—IX of FIGURE 8.

The second device, though independent, may easily be associated with the first, and is illustrated in FIGS. 6 to 12.

The plane-knife 30 is identical to that of the previous apparatus, that is to say it comprises a straight cutting blade 31 and a corrugated cutting blade 32. It is placed in position on the frame by simple pressure and is held in that position by elastic reaction.

The adjustable plate 33 is a simple piece of sheet-steel of substantially rectangular shape, stamped in the shape of a U, with two side wings 34—34 adapted to pass without friction between the cheeks 35 of the frame of the first device.

On the rear side, the plate comprises in each wing 34 a circular opening 36. These openings receive the horizontal extremities of a round wire member 37, stamped in a U-shape, forming a strut of the plate and placed in position in the wings of this latter by simple elasticity.

The leg of this strut 37 is curved in different planes in such manner that it assumes the shape of a hook 37a with two arms, adapted to hook elastically on to the center of the rear leg 5 of the chip-cutting device.

Each wing 34 comprises on the front side a notch 38 enabling the plate 33 to be hooked on to the extremities 6 of the rear leg 5.

It will be understood that the plate, which only receives pressures which are directed downwards from above, is firmly attached to the frame of the chip-cutting device.

For the adjustment of the thickness of each cut, each wing 34 comprises an opening forming a runner 39 for the displacement of a pin 40. This pin comprises at its center a curved portion 41 forming an extensible spring of the two arms 42—42 which pass through the wings in the runners 39 and are bent back to form a U so as to form two operating handles 43 and again pass through the runners so as to terminate in the interior of the wings 34.

When it is considered that the pin has been additionally subjected to bending of its four wires in the form of a curve 44 (FIG. 7), at the portion in the interior of the the wings 34 so as to displace the arms 42 into a plane which is slightly different from that of the handles 43, it will be understood that the pin has only a single freedom of movement: that of a movement of translation along the two runners.

The thickness of the beam 2 of the frame 1 was normally reduced by a curved portion 8 of its wings on the side of the leg 5 so as to impart to the beam the rational shape of a solid having comparable strength. This natural curve 8 which forms a rail provides a support for the handles 43.

It will be understood that the translation of the pin 40 in the runners 39 permits of a more or less deep penetration of the extremities 6 of the leg 5 in the notches 38. The table 33 pivoting about the fixed point 36 may thus be adjusted to the angle of slope corresponding to the required thickness of cut.

The group consisting of plate, strut and pin constitutes an assembly which is independent from the frame, from which it can easily be detached; the strut may be folded flat beneath the plate thus occupying the minimum space.

An additional device for the adjustment of the thickness of cut is shown in FIGS. 10 to 12.

According to this method of construction, a shaft 46 is mounted beneath the plate 45. This shaft comprises at one of its extremities an operating button and a shoulder 48, and at its other extremity a cylindrical portion 49 and a cam 50. The cylindrical portion 49 is engaged in a small cylindrical stamping 51 welded to the internal face of the front fold 52 of the plate 45, the rear fold 53 of the plate forming a bearing for the other extremity of the shaft 66 by means of an opening 54 formed in said fold. When the shaft 46 is placed in position it is prevented from becoming detached by the shoulder 48 and is thus capable of rotating freely on its own axis.

The mounting of the plate on the apparatus by means of a member 37 of round wire and of notches 38 is carried out as in the first form of construction described above.

Since the cam 50 of the shaft 46 rests on the plate of the frame 1, it will be understood that the rotation of the operating knob 47 enables the angle of slope of the plate 45 to be altered. The knob 47 may usefully be provided with a certain number of numbered sectors (from 0 to 5 on the drawing) and the fold 53 of the plate 45 can be provided with an indicator arrow 55. As each sector corresponds to a thickness of cut, commonly employed in practice, it will be easy for the user to obtain a precise adjustment of the thickness of cut required, without any search, simply by bringing the appropriate sector to face the indicator arrow.

It is of course understood that it would not be a departure from the scope of the invention to construct a movable plate, the adjustment device of which would either partially or totally form part of the frame. In particular the invention comprises any form of construction in which the table and its attachment device, such as those described above, are alone movable, while the adjustment unit which is constituted for example by a screw as in the previous apparatus, forms part of the frame.

What I claim is:

1. A slicing apparatus comprising:
   a rigid frame having a plurality of support legs depending therefrom at the opposite ends thereof;
   a cutter mounted on said frame intermediate the ends thereof;
   a horizontal plate having a forward end adjacent said cutter and a rearward end remote from said cutter, said plate being detachably mounted on said frame adjacent one end thereof and arranged for supporting articles to be fed to said cutter, said plate including means for engaging said frame so that the forward end of the plate may be raised and lowered with respect to said frame while preventing horizontal movement relative thereto;
   leg means independent of said support legs and said frame, said leg means depending from said plate adjacent the rearward end thereof, said plate being mounted on said leg means for pivotal movement about a substantially horizontal axis;
   manually operable means for raising and lowering the forward end of said plate with respect to said frame by pivoting same with respect to said leg means, said manually operable means including a shaft underlying said plate and being rotatably mounted thereon, a cam mounted on said shaft adjacent the forward end of said plate, said cam resting on said frame; and an operating knob mounted on said shaft whereby same may be rotated to thereby raise and lower the forward end of said plate.

2. A slicing apparatus according to claim 1, in which the shaft extends from the rearward end to the forward end of the plate, said operating knob being adjacent the rearward end of said plate.

3. A slicing apparatus according to claim 1 wherein said frame has a pair of members which are integral with said support legs, said plate having a pair of depending flanges having downwardly opening slots therein into which said members extend; and said leg means being detachably secured at its lower end to said support legs.

References Cited in the file of this patent
UNITED STATES PATENTS

| | | |
|---|---|---|
| 1,357,829 | Anstice | Nov. 2, 1920 |
| 1,809,824 | Bader | June 16, 1931 |
| 2,508,320 | Wheelwright | May 16, 1950 |

FOREIGN PATENTS

| | | |
|---|---|---|
| 787,965 | France | July 16, 1935 |
| 801,138 | France | May 16, 1936 |